3,708,269
Patented Jan. 2, 1973

3,708,269
FOSSIL FUEL HYDROGASIFICATION PROCESS FOR PRODUCTION OF SYNTHETIC PIPELINE GAS
Henry R. Linden, La Grange Park, Ill., assignor to Institute of Gas Technology
Filed Nov. 12, 1970, Ser. No. 88,651
Int. Cl. C01b *2/14, 2/22*
U.S. Cl. 48—215                  26 Claims

ABSTRACT OF THE DISCLOSURE

A process for producing a high methane content, synthetic pipeline gas from fluid fossil fuels including low grade petroleum oils alone and from a combination of fluid fossil fuels and solid fossil fuels, including bituminous coal, char, lignite, and oil shale. The process includes introducing the fluid fossil fuel and hydrogen rich gas to a hydrogasifier chamber which is maintained at about 500–2000 p.s.i.g. and about 1100–1600° F. The fluid fossil fuel is converted to a high methane content gas, normally liquid aromatic hydrocarbons, and a carbonaceous solid residue in the hydrogasifier. Pulverized solids are passed through the hydrogasifier and into a gasifier chamber, maintained at a pressure of about 500–2000 p.s.i.g. and at a temperature of about 1500–2100° F., to remove the carbonaceous residue or coke formed in the hydrogasifier by reaction of the fluid fossil fuel. A gaseous mixture is formed in the gasifier by reaction with steam and oxygen or with steam and air. The carbonaceous residue or coke formed in the hydrogasifier may be supplemented by introducing fossil fuels including bituminous coal, char, lignite, or oil shale into the gasifier, to produce more of the gaseous mixture. The gaseous mixture is then converted to a hydrogen rich gas either directly, by a carbon monoxide shift reaction (when steam and oxygen are used in the gasifier) or indirectly, by the steam-iron process (when steam and air are used in the gasifier). In the steam-iron process, the gaseous mixture is the reducing agent for iron oxides formed when added steam is converted to hydrogen over the reduced iron oxides. The hydrogen rich gas is purified and primarily includes hydrogen alone, in the case of the steam-iron process, or a combination of hydrogen and methane, in the case of the carbon monoxide shift process. This hydrogen rich gas is then introduced into the hydrogasifier to form the high methane content gas. All or a portion of the solids leaving the gasifier are recirculated back to the hydrogasifier.

BACKGROUND OF THE INVENTION, FIELD OF THE INVENTION AND DESCRIPTION OF THE PRIOR ART

This invention relates to a process for the manufacture of synthetic pipeline gas suitable as a substitute for or a supplement to natural gas, and it particularly relates to such a process wherein low cost fossil fuels, such as crude and residual petroleum oil, bituminous coal, char, lignite, and oil shale are used in the production of the synthetic gas.

It is well recognized that there is an increasing shortage of natural gas in the United States and there is a generally limited supply of natural gas throughout the world, as compared to more abundant reserves of liquid petroleum oils, coal and oil shale. Natural gas suitable for distribution to residential, commercial and industrial consumers is characterized by heating values ranging from about 900–1100 B.t.u./s.c.f., and by a high methane content, normally 80% by volume or greater. Such natural gas often also includes ethane and sometimes nitrogen. When the nitrogen content is high, propane and butane in addition to ethane may be left in the gas to compensate for the diluting effect of the nitrogen. Various sulfur compounds, carbon dioxide, and higher hydrocarbons are normally removed from the natural gas before distribution because they have an undesirable effect on transmission, distribution and usage of the natural gas. Therefore, in order to provide a suitable substitute or supplement for natural gas, such a substitute or supplement gas should consist largely of methane, some ethane, but have only a minimum of other constituents. The elementary composition of suitable natural gas supplements or substitutes is about twenty-five percent by weight of hydrogen and seventy-five percent by weight of carbon.

Substantial difficulties are encountered in producing natural gas substitutes or supplements from petroleum oils, coal or oil shale, because these fossil fuels contain hydrogen and carbon in a much lower weight ratio than 1:3, and, in the case of coal and oil shale, there are large amounts of undesired mineral constituents. Because of the shortage of hydrogen, in order to manufacture a suitable synthetic pipeline gas from a liquid or solid fossil fuel, hydrogen must either be added in the manufacturing process, or carbon must be removed. Removal of carbon is generally considered to be uneconomical. Conventional methods of forming natural gas supplements or substitutes therefore involve direct hydrogenation of the fossil fuel with an external source of hydrogen. Alternatively, indirect hydrogenation of the fossil fuel is accomplished by reacting the fossil fuel with steam to first form hydrogen and carbon monoxide and then recombining these gases to form methane by use of a catalytic process.

Ideal raw materials for producing a suitable synthetic pipeline gas are the low boiling, paraffinic petroleum fractions, because they have a relatively high hydrogen content and normally contain only small amounts of sulfur and other undesirable constituents. Commercial petroleum products which include these desirable fractions are LP-gas, naphtha, natural gasoline and kerosene. The principal disadvantage of using such materials as raw materials for producing synthetic pipeline gas is that they are too costly. Typically, these petroleum products cost roughly $1 per million B.t.u. of heating value. In contrast, natural gas delivered by pipeline usually costs about thirty cents to sixty cents per million B.t.u. Obviously, it is unfeasible, from an economic competitive standpoint, to manufacture synthetic pipeline gas from these high cost, low boiling, paraffinic petroleum fractions. A further practical drawback to the use of these raw materials is that they are simply not available in the huge amounts necessary to supplement or replace the dwindling supplies of natural gas throughout the world because, particularly in the United States, these are the raw materials used in the manufacture of motor fuels. As an exception to the foregoing, Western Europe has large quantities of low cost naphtha, and there are known commercial processes for converting naphtha to natural gas substitutes.

Because of the possible future shortage of natural gas and because of the economic unfeasability of using the low boiling, paraffinic petroleum fractions, a significant amount of attention has recently been given, particularly in the United States, to the manufacture of synthetic pipeline gas from relatively low cost raw materials, such as bituminous coal, lignite, oil shale, and low grade crude and residual fuel oils. Such raw materials generally cost about ten cents to fifty cents per million B.t.u., so that with a highly efficient and low investment cost process, synthetic pipeline gas, competitive with the cost of natural pipeline gas, could conceivably be produced from such sources.

As indicated previously, these low cost fuels are difficult to gasify because of low hydrogen content and because of the large number and unpredicatable amounts of undesirable constituents. For example, these raw materials generally have a high sulfur content which makes catalysis difficult because most hydrogenation catalysts are readily poisoned by sulfur compounds. Furthermore, low cost petroleum oils often contain such large amounts of vanadium and other metal compounds that the application of existing catalytic hydrogenation techniques becomes quite impractical. Still further, the tendency of these low cost petroleum feedstocks to lay down coke and to form other materials which block continuous gasification reactors generally necessitates the use of fluidized or moving beds of solid carrier materials which remove deposited coke, pitch, and the like from the gasification zone into a regeneration zone where they can be disposed of.

Because of the foregoing problems and disadvantages encountered in the use of low cost feedstocks to produce a suitable synthetic pipeline gas, nearly all the commercial processes with the capacity of producing a suitable synthetic pipeline gas, such as the (British) Gas Council's Catalytic Rich Gas (CRG) and the Gas Recycle Hydrogenator (GRH) processes, use light petroleum distillates, such as naphtha. The known commercial processes for producing synthetic pipeline gas are quie limited and are normally useful only with specific classes of fuels, and often may only be used with a specific type of fuel within the specific class. As a result, when there is a change in economic conditions, it is not possible to change the feedstock for the process.

SUMMARY OF THE INVENTION

It is therefore an important object of this invention to provide a process for producing synthetic pipeline quality gas from low grade petroleum oils alone or from both petroleum oil and solid carbonaceous fuel, wherein many of the disadvantages of such prior art processes are substantially avoided.

It is a further object of this invention to provide a process for producing synthetic pipeline gas from a wide range of fossil fuels including low cost petroleum oils, such as low grade crude oil and Bunker "C" fuel oil, or from such low cost petroleum oils plus solid fossil fuels, such as bituminous coal, char, lignite or oil shale, involving a wide range of proportions between the liquid and solid fuels.

It is also an object of this invention to provide a thermally very efficient process for producing a synthetic pipeline gas from fossil fuels wherein the produced gas has heating values as high as natural gas.

It is another object of this invention to provide a process for producing synthetic pipeline gas from low cost, liquid fossil fuels wherein the hydrogen used in the process to produce a high methane gas is produced as an integral part of the overall process, such as from residual carbonaceous residue or coke remaining after the formation of the product gas, and at the same time, the use of oxygen is minimized while the formation of additional methane is maximised.

It is still a further object of this invention to provide a process for producing a high heating value synthetic pipeline gas from a wide variety of fossil fuels while avoiding the thermodynamic limitations imposed by catalytic methanation as the final processing step.

It is yet another object of this invention to provide a process for producing synthetic pipeline gas from liquid fossil fuels or liquid and solid fossil fuels wherein hydrogasification and gasification zones are completely separated, with steam and oxygen or steam and air and the solid fossil fuels being introduced only in the gasification zone, in order to minimize the presence of oxygen-containing compounds, such as carbon dioxide, carbon monoxide and steam in the raw product gas.

It is also another object of this invention to avoid the use of catalysts in the gasification zone during the production of synthetic pipeline gas so that a wide range of liquid and solid fossil fuel feed material may be utilized without regard to possible detrimental effects of sulfur and nitrogen compounds, coke deposition, and mineral contaminants.

It is still a further object of this invention to provide a process for producing synthetic pipeline gas from liquid and solid fossil fuels wherein the formation of by-products and the loss of carbonaceous materials are minimized.

Further purposes and objects of this invention will appear as the specification proceeds.

The foregoing objects are accomplished by providing a process for producing a high methane content, synthetic pipeline gas from fluid fossil fuels including low grade petroleum oils alone and from a combination of fluid fossil fuels and solid fossil fuels, including bituminous coal, char, lignite, and oil shale. The process includes introducing the fluid fossil fuel and hydrogen rich gas to a hydrogasifier chamber which is maintained at about 500–2000 p.s.i.g. and about 1100–1600° F. The fluid fossil fuel is converted to a high methane content gas, normally liquid aromatic hydrocarbons, and a carbonaceous solid residue in the hydrogasifier. Pulverized solids are passed through the hydrogasifier and into a gasifier chamber, maintained at a pressure of about 500–2000 p.s.i.g. and at a temperature of about 1500–2100° F., to remove the carbonaceous residue or coke formed in the hydrogasifier by reaction of the fluid fossil fuel. A gaseous mixture is formed in the gasifier by reaction with steam and oxygen or with steam and air. The carbonaceous residue or coke formed in the hydrogasifier may be supplemented by introducing fossil fuels including bituminous coal, char, lignite, or oil shale into the gasifier, to produce more of the gaseous mixture. The gaseous mixture is then converted to a hydrogen rich gas either directly, by a carbon monoxide shift reaction (when steam and oxygen are used in the gasifier) or indirectly, by the steam-iron process (when steam and air are used in the gasifier). In the steam-iron process, the gaseous mixture is the reducing agent for iron oxides formed when added steam is converted to hydrogen over the reduced iron oxides. The hydrogen rich gas is purified and primarily includes hydrogen alone, in the case of the steam-iron process, or a combination of hydrogen and methane, in the case of the carbon monoxide shift process. This hydrogen rich gas is then introduced into the hydrogasifier to form the high methane content gas. All or a portion of the solids leaving the gasifier are recirculated back to the hydrogasifier.

BRIEF DESCRIPTION OF THE DRAWINGS

Particular embodiments of the present invention are illustrated in the accompanying drawings wherein.

DETAILED DESCRIPTION OF THE PREFERRED EMBODIMENTS

Figure 1:
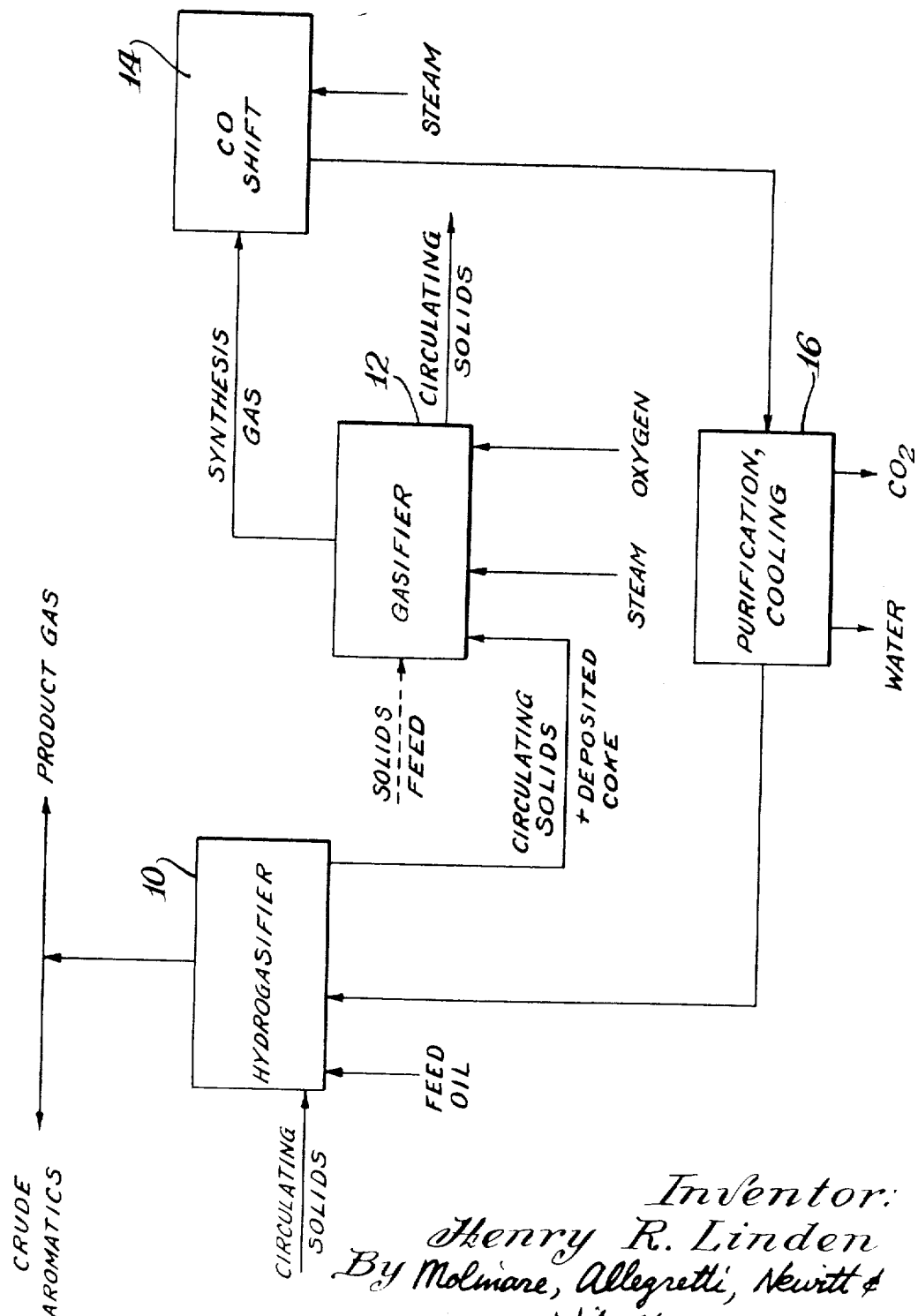
FIG. 1 is a simplified block diagram illustrating one embodiment of my process in a particularly simplified form.

Referring to FIG. 1, one embodiment of my process is illustrated in block diagram form. A hydrogasifier vessel 10 is provided for converting a normally liquid fossil fuel, such as a distillate, crude or residual petroleum oil into a suitable synthetic pipeline gas. The vessel is maintained preferably at a pressure of about 500 p.s.i.g. or above, but need not be maintained over about 2000 p.s.i.g. The temperature in the hydrogasifier vessel 10 is maintained at about 1100–1600° F., preferably at about 1200–1500° F.

Circulating solids are introduced to the hydrogasifier 10 by a suitable motivating force, preferably a portion of the hydrogen rich gas. Desirably, the bed of solids is maintained in the hydrogasifier 10 in the fluidized state by one or more streams of the hydrogen rich gas, preferably entering the hydrogasifier 10 at its lower portion, which gas is used as a reactant in the hydrogasifier to form the high methane content gas.

The circulating puverized solids in the hydrogasifier 10 preferably comprise either refractory material such as alumina, silica, or magnesia, or char or spent solids produced in the gasification of bituminous coal, char, lignite, or oil shale, which procedure will be hereinafter described in greater detail. The circulating solids in the vessel 10 have a two-fold function. First, the recirculating solids act as a heat transfer medium and secondly, they provide a medium for moving the deposited carbonaceous residue or coke from the hydrogasification vessel 10 to the gasifier vessel 12.

The hydrogen rich gas introduced to the hydrogasifier 10 should contain less than ten percent by volume of undesirable diluents, such as nitrogen, carbon dioxide and carbon monoxide. Preferably, the content of such undesirable diluents is maintained at less than five percent by volume. The nitrogen content of the hydrogen rich gas will depend primarily on the nitrogen content of the oxygen introduced to the gasifier vessel 12, although some nitrogen will be produced from the solid fossil fuel introduced to the gasifier vessel 12. The hydrogen rich gas, however, may contain relatively large proportions of methane, without detrimental effects. Substantial quantities of steam in the hydrogen rich gas are, however, to be avoided.

By maintaining the hydrogasification vessel 10 at the stated conditions, the petroleum feed oil is converted into a gaseous mixture of a high methane content, which also includes aromatic hydrocarbons ranging from benzene to high boiling polycyclics, and coke. The ratio between the amount of hydrogen in the hydrogen rich gas entering the hydrogasifier 10 and the feed oil determines the product distribution, that is, the higher the hydrogen to oil feed ratio, the more gas and less coke is formed, while as the carbon to hydrogen ratio of the feed oil is increased, the less gas and the more coke is formed. The formation of liquid aromatics is less sensitive to feed oil properties and operating conditions and generally falls in the range of 5–20 percent by weight of the feedstock. Higher pressures, temperatures, and higher hydrogen to oil feed ratios in the hydrogasifier 10 all act to reduce the amount of liquid products formed in the hydrogasifier.

Advantageously, the ratio of the hydrogen rich gas to feed oil should be about 30–80% of the stoichiometric requirements for converting the feed oil to methane. With highly reactive distillate petroleum fractions such as naphtha, kerosene, diesel oil and the like, the hydrogen to oil feed ratio may be as high as 100% of the stoichiometric requirements for methane formation. The lower portion of the range of the ratio of hydrogen rich gas to oil is used when all the hydrogen is produced from coke or carbonaceous residue deposited in the hydrogasifier, while the higher portion of the range is used when most of the hydrogen is produced from an extraneous source of carbonaceous material, such as coal or oil shale. As 100 percent of the stoichiometric hydrogen requirements is approached with the less reactive residual and low grade crude oils, more and more unreacted hydrogen leaves the hydrogasifier vessel 10 with the product gas so that it is not practically possible to produce a gas of the desired 900–1100 B.t.u./s.c.f. of heating value, for example, from such feedstocks at very high hydrogen to oil feed ratios.

As indicated previously, the circulating solids are passed, preferably by gravity feed, from the hydrogasification vessel 10 to the steam-oxygen gasification vessel 12. The gasification vessel 12 is maintained at a temperature of about 1500–2100° F., and preferably at 1600–1900° F., while the pressure in the gasifier vessel 12 is maintained at a level which is equivalent to that in the hydrogasifier 10.

In the gasifier vessel 12, steam and oxygen are introduced for converting carbon therein into a synthesis gas including hydrogen, carbon monoxide and carbon dioxide. The reactions in the gasifier 12 include the following:

$$C + H_2O \rightarrow CO + H_2 \qquad (1)$$

$$CO + H_2O \rightleftharpoons CO_2 + H_2 \qquad (2)$$

$$C + O_2 \rightarrow CO_2 \qquad (3)$$

$$C + \tfrac{1}{2}O_2 \rightarrow CO \qquad (4)$$

Since Reaction 1 is highly endothermic, oxygen is introduced to the gasifier 12 so as to convert a portion of the carbon in the vessel 12 by the exothermic Reactions 3 and 4 to form carbon dioxide and carbon monoxide. Reaction 2 is a gas phase reaction which maintains a close approach to chemical equilibrium.

By maintaining the gasifier vessel 12 at the stated conditions and by providing for vigorous fluidization and back-mixing of the circulating solid materials passing into the gasifier 12 with the incoming steam and oxygen streams, substantial amounts of methane are formed in the gasification vessel 12. Although the specific mechanism of methane formation is not fully understood, the amount of methane formed under these conditions is considered to be significantly greater than predictable by the thermodynamic equilibrium of the classic methanation reaction:

$$CO + 3H_2 \rightleftharpoons CH_4 + H_2O$$

It is believed that the high level methane formation is the result of continuous activation of the carbonaceous material by partial conversion thereof with steam and oxygen. The high methane formation is helpful as it reduces the consumption of costly oxygen in at least two ways; first, less heat needs to be generated by the oxidation reaction since methane formation is exothermic; and secondly, any carbon which is gasified in the form of methane does not have to be gasified by the endothermic steam decomposition Reaction 1.

The synthesis gas formed in the gasifier 12 is passed to the carbon monoxide shift reactor 14. The synthesis gas is there subjected to the well known carbon monoxide shift reaction or water gas shift reaction, wherein steam converts carbon monoxide in the synthesis gas to carbon dioxide and hydrogen over a suitable catalyst. The temperature of the shift reactor 14 is maintained at about 550–750° F., with typical iron-chromia catalysts.

After passing through the shift reactor 14, the gaseous mixture, then primarily hydrogen, methane, carbon dioxide and gaseous water is passed to a purification and cooling system 16 wherein the carbon dioxide and water are separated out so as to form the hydrogen rich gas, primarily methane and hydrogen, which is then passed to the hydrogasifier unit 10 for reaction with the feed oil.

In the described embodiment, there is no need for an external hydrogen source for oil gasification, as found in the prior art and as used by commercial gasifiers for converting additional feed oil into hydrogen by gasification with steam and oxygen. Also, in my system, extraneous, low cost carbonaceous material is useful as a substitute for a portion of the coke formed during hydrogasification of the feed oil. This is accomplished by feeding low cost solid fossil fuels, such as bituminous coal, char, lignite or oil shale directly into the steam-oxygen gasifier 12. In this way, more hydrogen is generated in the gasifier 12 and is ultimately transmitted to the hydrogasification vessel 10, which results in a higher conversion of the feed oil to pipeline quality gas, and less coke formation.

When feeding bituminous coal, char, lignite or oil shale into the gasifier 12, additional methane is also formed by destructive hydrogenation (hydrogasification) reactions and by destructive distillation (pyrolysis) reactions. This higher quanity of methane formation in the gasifier 12 increases the total production of pipeline quality gas per unit of oil feed. This gasification technique thereby greatly increases the flexibility for using a variety of raw materials useful in my process. For example, when a high cost, high quality distillate oil is used, its consumption will be significantly reduced by adding a substantial amount of low cost bituminous coal, char, lignite, or oil shale to the gasifier 12.

Also, some feed oil, if desired, may be used in the steam-oxygen gasifier 12, for example, to start up the process. Feed oil may also be used as an auxiliary raw material for hydrogen rich gas manufacture to supplement the amount which can be produced from deposited coke and from extraneous sources of solid carbonaceous fuels. For example, an attractively priced distillate oil may be used in the hydrogasifier 10, but such an oil does not deposit sufficient carbonaceous residue or coke on the circulating solids to meet hydrogen requirements. At the same time, low cost coal or oil shale may not be readily available so that auxiliary residual oil would be fed to this steam-oxygen gasifier 12. If there is a depressed market for aromatic byproduct liquids, these liquids can be used as an auxiliary feed oil. Thus, in the described embodiment, it is possible to use an integral, relatively low temperature, high pressure, fluidized bed, steam-oxygen gasifier which uses substantially all of the coke or carbonaceous residue which is deposited in the hydrogasification vessel 10, and to supplement this low cost source of hydrogen by several other means as dictated by economic considerations.

It is important that supplementary carbonaceous fuels are introduced to the gasification vessel so as to allow for direct formation of methane and ethane from their more reactive constituents by destructive hydrogenation or hydrogasification by contact with the hot hydrogen rich gas present in the steam-oxygen gasifier. It is desirable to minimize the formation of high boiling liquid products in the gasification vessel 12 so as not to complicate the purification process for production of the relatively high purity, hydrogen-methane gas to be recycled to the hydrogasification vessel 10.

Bituminous coal, char, lignite, or oil shale are pulverized and introduced to the gasifier in a manner which provides for concurrent downward flow of gas and solids during the solids heat-up period. Carbonaceous feeds with high tar and pitch forming propensity may be fed directly into the spent solids leaving the hydrogasification vessel 10. Care is to be exercised so as not to unnecessarily destroy the reactive constituents in the carbonaceous solid feed material by premature exposure to stream and oxygen and to the high temperature zone of the gasifier vessel 12 which reduces the highly desirable direct formation of methane in the gasifier 12.

Figure 2:
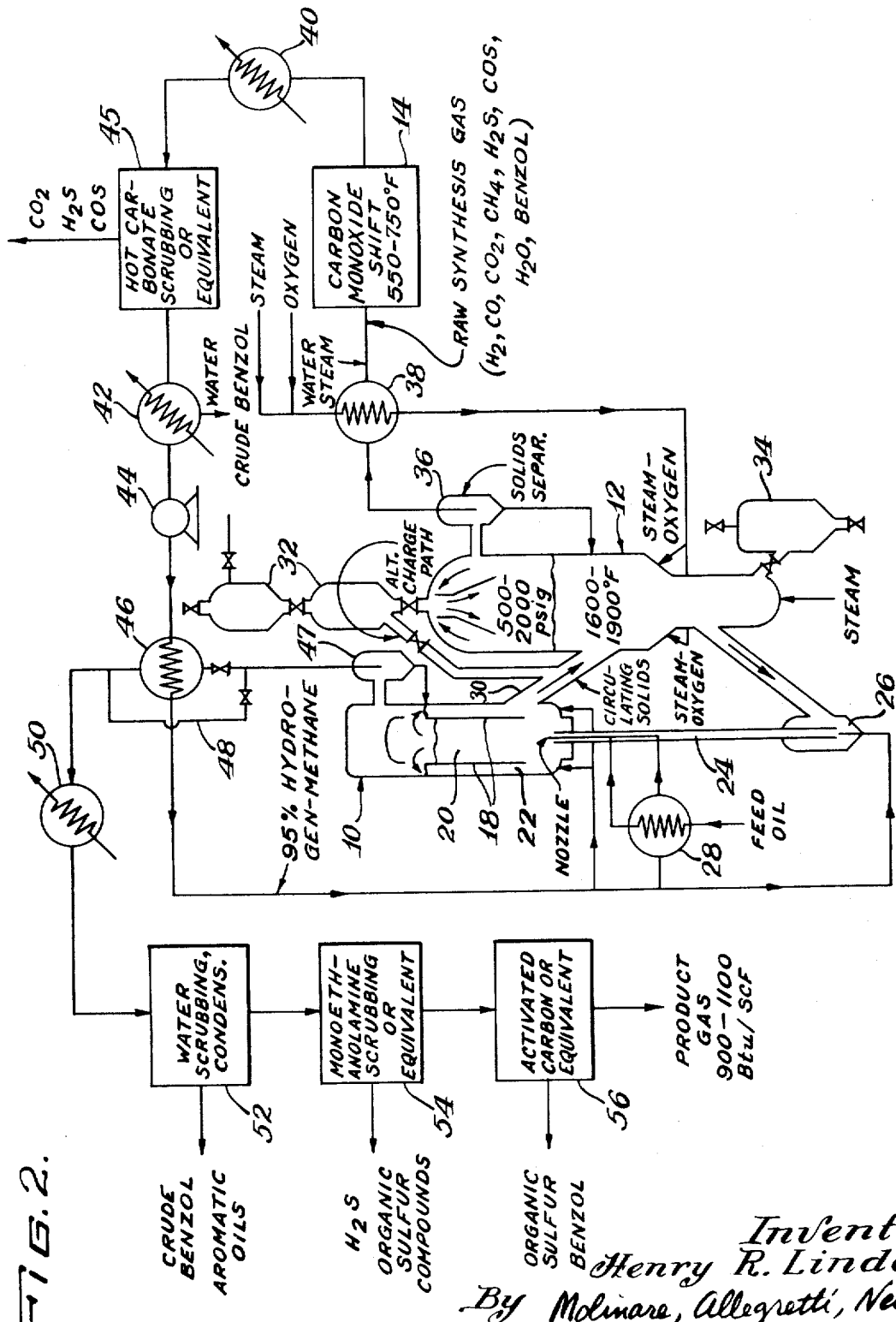
FIG. 2 is a diagrammatic view illustrating the process embodied in FIG. 1 is somewhat more detail.

Referring to FIG. 2, there is provided a somewhat more detailed diagram illustrating a preferred system useful in the practice of the embodiment of FIG. 1. The The hydrogasification vessel 10 is a closed upright cylindrical vessel having internal baffles 18 which generally define an upwardly moving central bed 20 and a downwardly moving annular bed 22. The circulating solids are passed upwardly into the vessel 10 through a central feed tube 24 which feeds the solids into the bottom of the hydrogasifier vessel 10. A lift pot 26 provides the motivating lift force for the solids by use of one stream of hydrogen rich gas.

Hydrogen rich gas is passed through a heat exchanger 28 through which the feed oil is also passed for preheating. The hydrogen rich gas passes from the heat exchanger 28, into the central tube 24 while the feed oil, after passing through the heat exchanger 28, also passes to the tube 24, but at a position above the feed point of the hydrogen rich gas. Other streams of hydrogen rich gas are also injected directly into the underside of the hydrogasification vessel 10, as shown. Thus, the hydrogen rich gas is passed into the circulating stream of solids at several different points, including the lift pot 26, in the tube 24 below the hydrogasifier 10, and directly into the bottom of the hydrogasifier. The annular, downwardly moving bed 22 passes through a downwardly angled channel 30 where the circulating solids pass to the gasifier vessel 12.

The design of hydrogasification vessel 10 is patterned after prior art, notably the (British) Gas Council's Fluidized Bed Hydrogenator. Other designs are, of course, feasible. However, the spatial relationships between vessels 10, 12 and 26 of FIG. 2 are an important part of this invention. Movement of the solids, through the hydroagsifier vessel 10 and the gasifier vessel 12 and to the lift pot 26, and contacting of the various gaseous, liquid and solid feed streams and the solids, is advantageously accomplished by fluidizing the solids in the hydrogasifier vessel 10 and gasifier vessel 12 and by gravity flow of the solids from the hydrogasifier vessel 10 to the gasifier vessel 12 and to the lift pot 26.

The fossil fuel charging of the gasifier unit 12 may be accomplished through alternate paths. A pair of fossil fuel charging lock hoppers 32 are mounted directly to the top portion of the gasifier 12. One path of feed for the solid fuel is directly into the upper end of the vessel 12, by suitable valve control. Alternatively, a branch line from the hoppers 32 is provided to direct solid fuel directly to the channel 30 for gravity feed to the gasifier vessel 12. Suitable valves are provided so that the desired introductory path of travel of the solid fuel to the gasification vessel 12 is selected, and so that solids can be charged against pressures of 500 to 2000 p.s.i.g.

The circulating solids pass from the lower end of the gasifier vessel 12, by gravity feed, to the lift pot 26, wherein the hydrogen rich gas recirculates the solids to the hydrogasifier 10. When the solids in the gasifier 12 consist of spent coal, char, or oil shale, a continuous stream of high ash residue is withdrawn at the bottom or base of the gasifier 12 through the hopper 34, so as to prevent build up of spent solids in the gasifier 12.

With highly frangible materials, provision is also made for removal of fines, preferably at the gas-solids separator 36, which is located at the upper portion of the gasifier vessel 12. The separator 36 recirculates solids, which are entrained in the synthesis gas passing from the gasifier 12, back to the gasifier. As shown, steam is desirably introduced at the lower end of the gasifier 12 while multiple streams of a steam-oxygen mixture are introduced to the gasifier 12 intermediate the bottom and top of the moving bed therein. Separate sources of steam and oxygen are intermixed and passed through a heat exchanger 38 before introduction to the gasifier 12. The synthesis gas also passes through the heat exchanger 38 for cooling prior to introduction to the carbon monoxide shift reactor 14, preferably maintained at about 550–750° F. Prior to introduction to the carbon monoxide shift reactor 14, the raw synthesis gas comprises a gaseous mixture of hydrogen, carbon monoxide, carbon dioxide, methane, hydrogen sulfide, carbon oxysulfide, gaseous water and benzol. After passing through the carbon monoxide shift reactor 14, the carbon monoxide in the gas is substantially removed and the gaseous mixture is then passed through a waste heat boiler 40.

After passing through the waste heat boiler 40, the gaseous mixture passes through a hot carbonate scrubbing unit 45 for supbstantially removing carbon dioxide, hydrogen sulfide, and carbon oxysulfide. The remaining gaseous mixture is then passed to a cooler-condenser 42 where water and crude benzol are removed.

Upon passing from the cooler-condenser unit 42, the treated gaseous mixture, now a high hydrogen content gas, primarily hydrogen and methane, is passed through a compressor 44 and finally through a heat exchanger 46. The hydrogen rich gas is then recirculated to the hydrogasifier 10 through the previously described multiple paths of travel.

The product gas passing from the hydrogasifier 10 through the solids separator 47 at the upper end of the hydrogasifier 10 passes to the heat exchanger 46 or alternatively through a bypass line 48. The product gas then passes through a waste heat boiler 50 and then to a water scrubbing condenser 52 where crude benzol and aromatic oils are removed. Following passage through the water scrubbing unit 52, the product gas is passed to the monoethanolamine scrubbing unit 54, where hydrogen sulfide and organic sulfur compounds are removed. The product gas is finally passed through the activated carbon unit 56 where more organic sulfur and benzol are removed. The product gas leaving the activated carbon unit 56 is a high heat value synthetic pipeline gas having a heating value in the desired range of 900–1100 B.t.u./s.c.f.

The product gas and hydrogen rich gas purification systems described above are conventional, as are the heat exchange and heat recovery systems described. However, the difficult and inefficient catalytic methanation step used in the prior art for producing pipeline quality gas from coal, and in much prior oil gasification art, is not required in the product gas purification system because the hydrogasification vessel 10 is kept isolated from oxygen containing streams. Temperature control in the hydrogasification vessel, in which exothermic reactions take place, is accomplished by control of the hydrogen rich gas temperature through partial or total by-pass of the heat exchanger 46. Additional control is obtained by raw product gas recycle after heat recovery in the product gas waste boiler 50.

Figure 3:
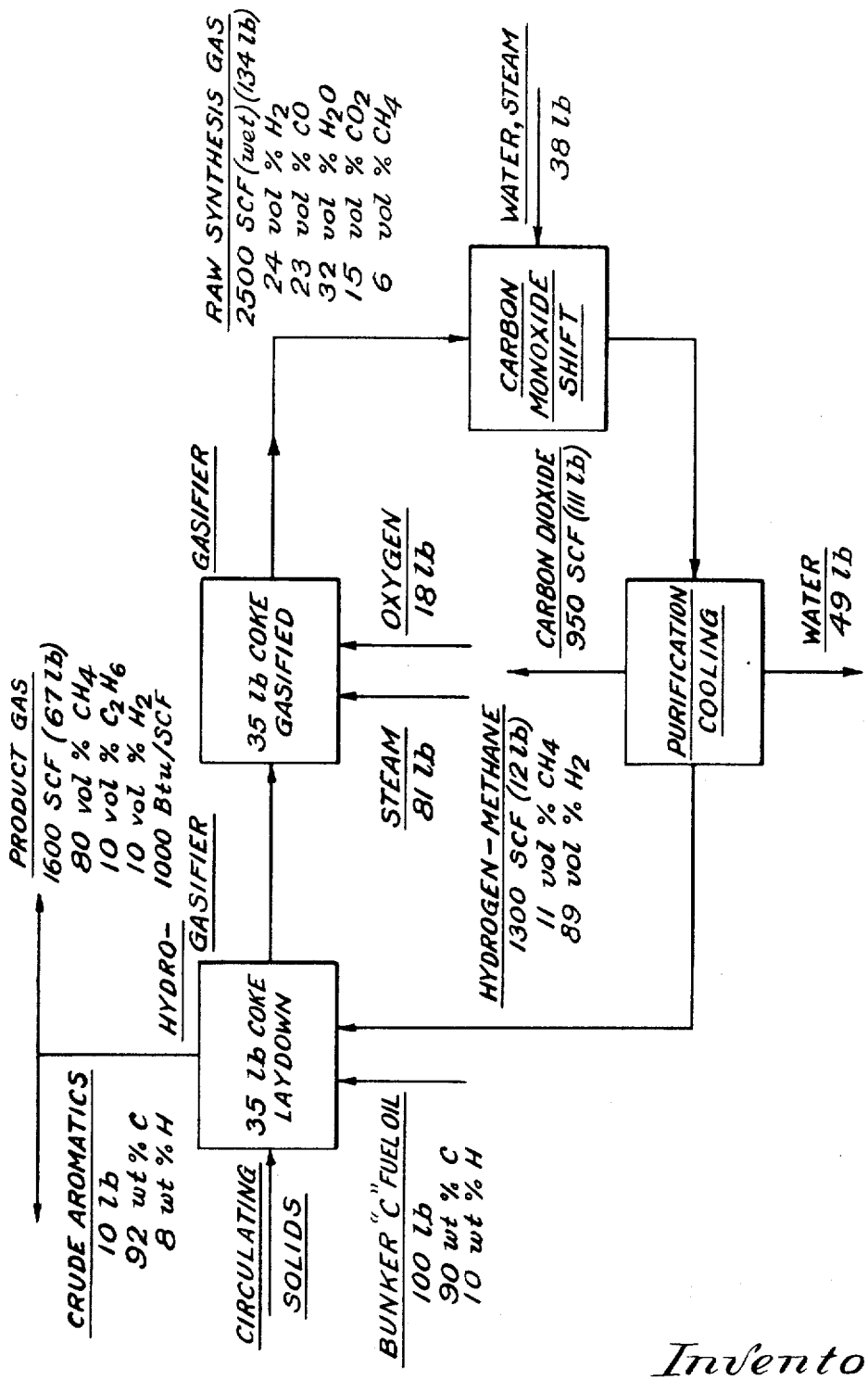
FIG. 3 is a diagrammatic view illustrating one specific embodiment of my invention.
Figure 4:
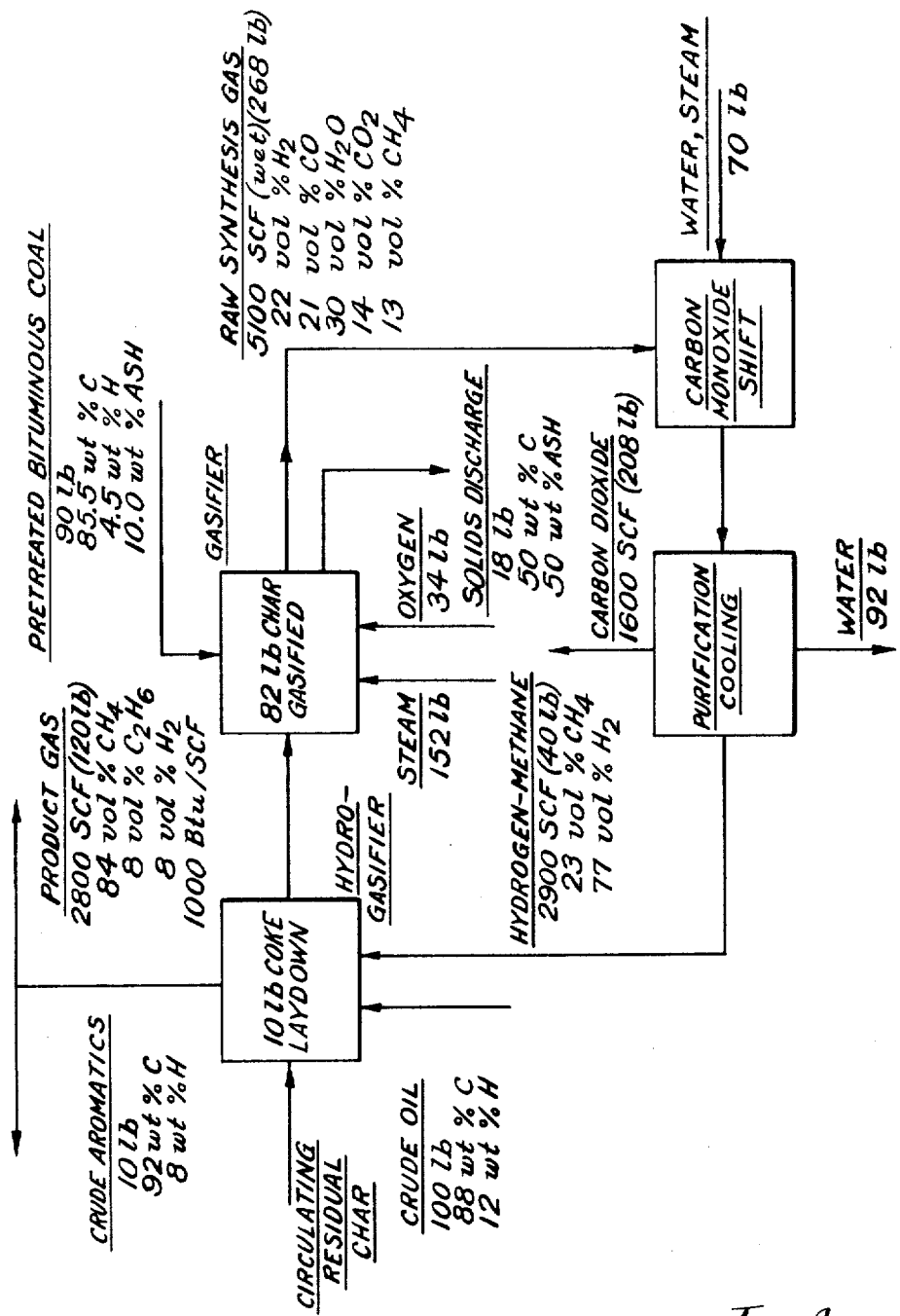
FIG. 4 is another diagrammatic view illustrating another specific embodiment of my invention.

Referring to FIGS. 3 and 4, specific examples of the described embodiment of my invention are shown. In the example of FIG. 3, an inert heat transfer circulating solid medium and a low grade Bunker "C" fuel oil are used. In FIG. 4, a pretreated bituminous coal and a low grade crude oil are used. In both cases, a 1000 B.t.u./s.c.f. heating value gas, containing mostly methane, with ethane balancing the hydrogen content, results.

In the following Table I there is a calculation of estimated gas prices for the examples of FIGS. 3 and 4. The results show that such a gas is competitive with natural gas prices in many areas of the world.

TABLE I

| Process requirements | Inert heat transfer solids | | Bituminous coal char heat transfer solids | |
|---|---|---|---|---|
| | Quantity/ MMCF | $/ MCF | Quantity/ MMCF | $/ MCF |
| Bunker "C" fuel oil at $2.00/bbl | 180 bbl | 0.36 | | |
| Crude oil at $2.50/bbl | | | 110 bbl | 0.28 |
| Bituminous coal at $4/ton | | | 18 ton | 0.07 |
| Oxygen at $7/ton | 6 ton | 0.04 | 6 ton | 0.04 |
| Total | | 0.40 | | 0.39 |
| Byproduct credits: | | | | |
| Crude aromatics at 10 cents/gal. | 800 gal | 0.08 | 500 gal | 0.05 |
| Sulfur at $20/ton | 1 ton | 0.02 | 1 ton | 0.02 |
| Net raw material costs | | 0.30 | | 0.32 |
| Labor, supplies, miscellaneous | | 0.05 | | 0.05 |
| Fixed charges: 15 percent annually at 90 percent operating factor. | | ¹ 0.14 | | ² 0.18 |
| Total gas price | | 0.49 | | 0.55 |

¹ Estimated total investment of $300/MCF-day.
² Estimated total investment of $400/MCF-day.

Figure 5:
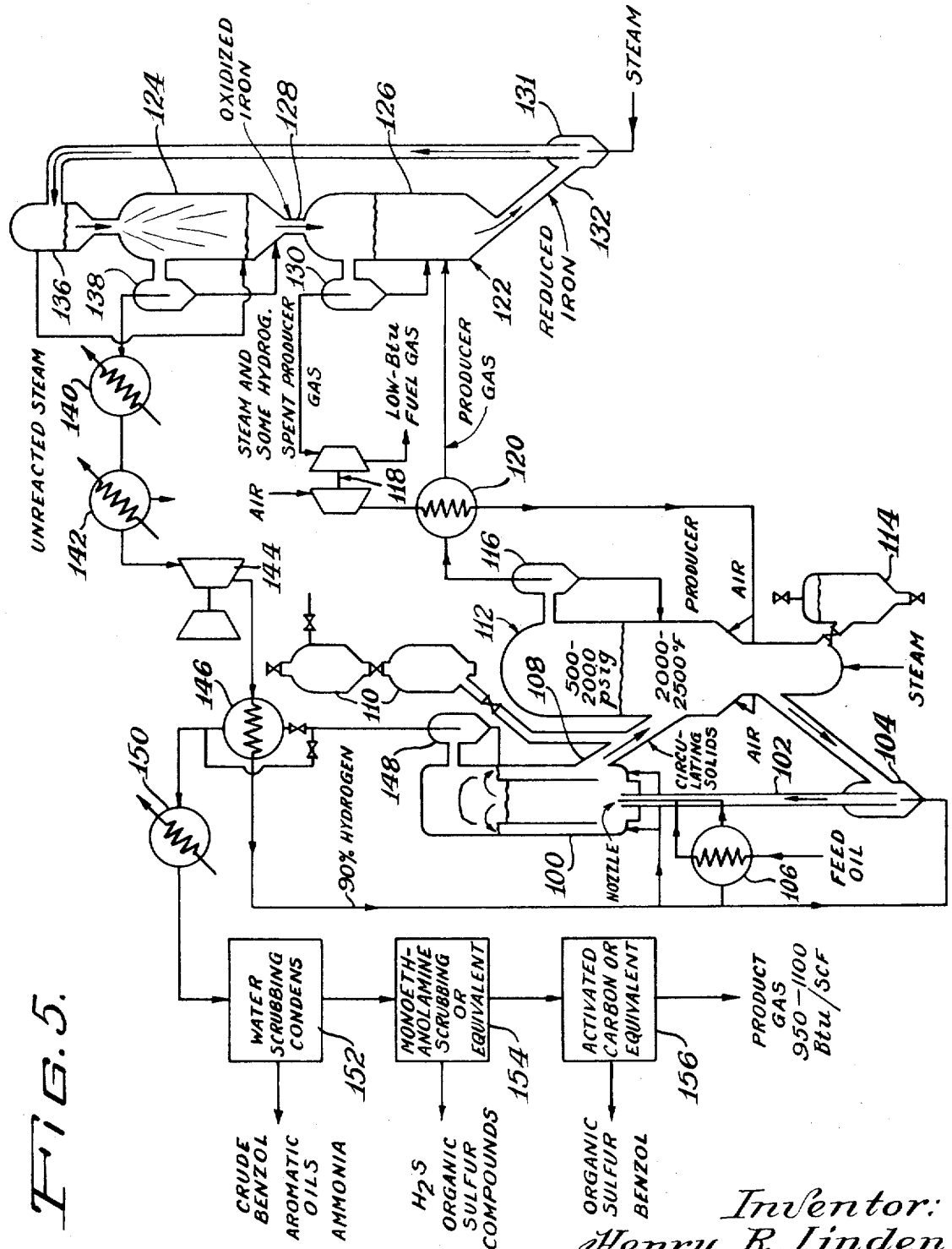
FIG. 5 is a diagrammatic view, similar to FIG. 2, illustrating an alternate embodiment of my invention.

In FIG. 5, there is shown an alternate embodiment of my invention wherein the gasifier vessel forms a different gaseous mixture than in the embodiment discussed above. Generally, the hydrogasifier in the embodiment of FIG. 5 operates at the same conditions with substantially the same reactants. However, the reaction conditions in the gasifier of FIG. 5 are different and a product gas comprising nitrogen, carbon dioxide, carbon monoxide, and gaseous water is formed therein. The produced gas is subsequently passed to a steam-iron reaction vessel wherein a gaseous mixture consisting of at least about 90% hydrogen is produced. The hydrogen thus formed is then passed to the hydrogasifier for formation of the desired product gas.

As in the embodiment of FIG. 2, the hydrogasifier vessel 100 is maintained at a pressure of 500 p.s.i.g. or above, but not necessarily over 2000 p.s.i.g. The temperature is maintained at about 1100–1600° F., and preferably at 1200–1500° F. The feed oil is a liquid fossil fuel, such as a distillate, crude or residual petroleum oil. The hydrogasifier is constructed like that of the embodiment of FIG. 2, and the bed of circulating solids is passed into the vessel 100 through the feed tube 102. A lift pot 104 also provides the upward lift force for the circulating solids through introduction of a stream of hydrogen rich gas.

Hydrogen rich gas is also introduced to the hydrogasifier 100 through its bottom portion and, after passage through the heat exchanger 106 through which the feed oil is passed, through the feed tube 102 at a position intermediate the vessel 100 and the lift pot 104. The circulating solids pass from the vessel 100 through the downwardly angled channel 108 by gravity feed, the circulating solids also carrying the carbonaceous residue or coke remaining after reaction of the feed oil and the hydrogen rich gas in the hydrogasifier 100.

A pair of fossil fuel charging lock hoppers 110 are mounted generally above the gas producer vessel 112. In this embodiment, however, only one fossil fuel charging path is provided by direct feed of the solid fuel to the channel 108 for gravity feed to the vessel 112 together with the circulating solids which carry the carbonaceous residue or char from the hydrogasifier 100.

In the embodiment of FIG. 5, air is used in the vessel 112 rather than oxygen, which is used in the embodiment of FIG. 2. Thus, the present embodiment is a desirable alternate method in the event that oxygen is costly. When air is used, however, the produced gas contains a relatively high portion of nitrogen (about 40 percent by volume on a dry basis) and thus is not a direct source of hydrogen rich gas. However, the produced gas is used as an integral part of the process which directly produces the hydrogen rich gas. Thus, the processing of the produced gas varies from the processing of the synthesis gas described for the embodiment of FIGS. 1 and 2.

The producer gas vessel 112 operates at a pressure of about 500–2000 p.s.i.g., equivalent to that of the hydrogasifier 100 and at a temperature of about 2000–2500° F. This temperature range is higher than that employed in gasifier 12 of the first embodiment and permits use of a smaller and less expensive gas producer vessel, as compared to the gasifier 12. Furthermore, the present embodiment does not intend to produce methane in the vessel 112, which production is formed by the relatively low temperature operation of the vessel 12 in the first embodiment. In this embodiment, the produced gas or gaseous mixture made in the vessel 112, as will be described hereinafter, is used as a reducing gas for the steam-iron process. Thus, any methane which is formed would not add to the yield of pipeline-quality high methane gas.

Circulating solids pass by gravity feed from the producer gas vessel 112 to the lift pot 104 and the hydrogen rich gas recirculates these solids back to the hydrogasifier 100. When the solids in the vessel 112 are spent coal, char, or oil shale, a continuous stream of high ash residue is withdrawn at the base of the vessel 112 through the solids discharge hopper 114. With highly frangible materials, provision is also made for removal of fines, preferably at the gas-solids separator 116, located at the upper portion of the vessel 112.

Air is introduced at multiple locations to the lower portion of the vessel 112 after passage through the compressor half of an expander-compressor unit 118 and also after pre-heating in a heat exchanger 120. Steam is also introduced to the lower portion of vessel 112. The producer gas passing from the separator 116 is cooled in the heat exchanger 120 prior to introduction to the steam-iron processor unit 122. The producer gas, at this point of the process, generally comprises carbon dioxide, carbon monoxide, nitrogen and gaseous water.

In the steam-iron processor 122, iron ore or other iron oxide materials are subjected to cyclic oxidation and reduction at elevated temperatures. The steam-iron process is well known and is described, for example, in U.S. Pats. Nos. 3,222,147 and 3,442,620. An upper oxidizer section 124 and lower reducer section 126 are provided, a restricted channel 128 interconnecting the bottom of the oxidizer 124 and the top of the reducer 126.

Iron oxide, oxidized in the oxidizer section 124, is reduced by the producer gas which is introduced to the reducer section 126 by the following reactions, for example:

$$Fe_3O_4 + CO \rightarrow 3FeO + CO_2$$

$$FeO + H_2 \rightarrow Fe + H_2O$$

The spent producer gas after use in the reducer section 126 is advantageously passed through a gas-solids separator 130 and the spent producer gas is used to drive the expander-compressor unit 118. This spent producer gas may thereafter be used as a low B.t.u. fuel gas. The reducer section 126 is desirably maintained at a pressure of about 200–2000 p.s.i.g. and at a temperature of about 1400–1600° F.

The reduced iron oxide is discharged at the bottom of the reducer section 126 by gravity feed through the discharge channel 132 and is passed to a lift pot 131. Steam is injected to the lift pot 131 and is not only the oxidizing agent for the reduced iron oxide, but it is the motivating force for lifting the reduced iron oxide to the oxidizer section 124. Entrained iron and iron oxide are passed through a separator 136 from which the iron and iron oxide are discharged by gravity to the oxidizer section 124. Desirably, the oxidizer 124 is maintained at a temperature of about 1300–1500° F. and 200–2000 p.s.i.g. Steam from the separator is injected to the oxidizer 124, as shown. In the course of reaction of the steam, the direct source of hydrogen, with iron or lower iron oxides, hydrogen is formed by reactions such as:

$$Fe + H_2O \rightarrow FeO + H_2$$

$$3FeO + H_2O \rightarrow Fe_3O_4 + H_2$$

The hydrogen thus formed is passed through a gas-solids separator 138. Any entrained iron or iron oxide is recovered and returned to the steam-iron processor 122. The produced hydrogen is then passed through a waste heat boiler 140 and a water condenser 142, for removal of gaseous water or steam. At this point, the hydrogen content of the gas is at least about 90 percent by volume.

Since the steam-iron processor 122 operates generally at a lower pressure than the hydrogasifier 100 and producer vessel 112, the hydrogen is passed through a compressor unit 144. The hydrogen is then passed through a heat exchanger 146 for pre-heating prior to introduction at multiple locations to the hydrogasifier 100.

The gas passing from the hydrogasifier 100 is thereafter processed in a manner similar to the embodiment of FIG. 2. Thus, the gas is passed through a gas-solids separator 148, and, if desired, may be cooled by passage through the heat exchanger 146. The gas is cooled again in a waste heat boiler 150. Thereafter, the product gas is passed through a water scrubbing condenser 152 for removal of crude benzol, aromatic oils, and ammonia, through a monoethanolamine scrubbing unit 154 for removal of hydrogen sulfide and organic sulfur compounds, and through an activated carbon unit 156 for separation of more organic sulfur and benzol from the product gas. The product gas resulting is a high methane content, synthetic pipeline gas having a heating value of 900–1100 B.t.u./s.c.f.

While in the foregoing there has been provided a detailed description of specific embodiments of the present invention, it is to be understood that all equivalents obvious to those having skill in the art are to be included within the scope of the invention as claimed.

What I claim and desire to secure by Letters Patent is:

1. A process for producing a high methane content, synthetic pipeline gas from fossil fuels, said process comprising the steps of promoting a hydrogenation reaction in a first chamber between a liquid fossil fuel and hydrogen rich gas in the presence of circulating solids to produce said high methane content, synthetic pipeline gas and a carbonaceous residue, contacting in a second chamber said carbonaceous residue and said circulating solids with a free oxygen containing gas and steam to produce a gaseous mixture and at least a portion of said circulating solids, using said circulating solids as a heat transfer medium during the production of said gaseous mixture, reacting said gaseous mixture for production of said hydrogen rich gas used in the hydrogenation of said liquid fossil fuel, transporting at least a portion of said circulating solids directly from said second chamber to said first chamber, and carrying said carbonaceous residue, formed upon hydrogenation of said liquid fossil fuel directly from said first chamber to said second chamber with said circulating solids.

2. The process of claim 1 wherein said first chamber is maintained at a pressure of about 500–2000 p.s.i.g. and at a temperature of about 1100–1600° F., said second chamber is maintained at a pressure of about 500–2000 p.s.i.g. and at a temperature of about 1500–2100° F., and said oxygen containing gas includes both steam and oxygen for forming a gaseous mixture which includes hydrogen, methane, carbon monoxide, and carbon dioxide.

3. The process of claim 2 wherein said first chamber is maintained at a temperature of about 1200–1500° F. and said second chamber is maintained at a temperature of about 1600–1900° F.

4. The process of claim 1 wherein said second chamber is maintained at a pressure of about 500–2000 p.s.i.g. and at a temperature of about 1500–2100° F., and said oxygen containing gas includes both steam and oxygen for forming a gaseous mixture which includes hydrogen, methane, carbon monoxide, and carbon dioxide.

5. The process of claim 1 wherein said hydrogen rich gas contains less than about 10% by volume of diluents including carbon dioxide, carbon monoxide and nitrogen.

6. The process of claim 1 wherein said high methane content synthetic pipeline gas contains less than about 5% by volume of diluents including carbon dioxide, carbon monoxide and nitrogen.

7. The process of claim 1 wherein said liquid fossil fuel introduced into said first chamber includes distillate, crude, or residual petroleum oils.

8. The process of claim 1 including the step of introducing solids selected from solid fossil fuels and refractory material to said second chamber.

9. The process of claim 1 including the step of introducing solid fossil fuels to said second chamber to supplement said carbonaceous residue for producing said gaseous mixture.

10. The process of claim 9 wherein said solid fossil fuels are selected from bituminous coal, char, lignite, and oil shale.

11. The process of claim 1 wherein said liquid fossil fuel introduced into said first chamber includes distillate, crude, or residual petroleum oils, and pulverized solids are introduced to said second chamber, said solids including pulverized materials selected from alumina, silica, magnesia, bituminous coal, char, ligntie, oil shale, and mixtures thereof.

12. The process of claim 1 wherein said liquid fossil fuel includes low-boiling paraffinic petroleum fractions and wherein the ratio of hydrogen rich gas to liquid fossil fuel introduced into said first chamber is maintained at up to 100% of the stoichiometric requirements for converting said liquid fossil fuel into methane.

13. The process of claim 1 wherein the ratio of hydrogen rich gas to liquid fossil fuel introduced into said first chamber is maintained within a range of about 30-80% of the stoichiometric requirements for converting said liquid fossil fuel into methane.

14. The process of claim 1 wherein said circulating solids with said carbonaceous residue deposited thereon are carried from said first chamber into said second chamber by gravity feed.

15. The process of claim 1 including the step of discharging a portion of said circulating solids from said second chamber.

16. The process of claim 1 wherein said circulating solids in said first chamber are maintained in the fluidized state in said first chamber with said hydrogen rich gas.

17. The process of claim 1 including the step of adding solid fossil fuel to said circulating solids and said carbonaceous residue during movement from said first chamber to said second chamber.

18. The process of claim 1 including the step of introducing pulverized solid fossil fuels into said second chamber, and providing concurrent downward flow of said gaseous mixture and said pulverized solid fossil fuels during the heating of said solid fossil fuels.

19. The process of claim 1 wherein said product gas has a heating value of at least 900 B.t.u./s.c.f.

20. The process of claim 1 wherein said product gas has a heating value of about 900-1100 B.t.u./s.c.f.

21. The process of claim 4 including the step of promoting a carbon monoxide shift reaction with said gaseous mixture for producing said hydrogen rich gas from said gaseous mixture.

22. The process of claim 1 wherein said first chamber is maintained at a pressure of about 500-2000 p.s.i.g. and at a temperature of about 1100-1600° F., said second chamber is maintained at a pressure of about 500-2000 p.s.i.g. and at a temperature of about 2000-2500° F., and said oxygen containing gas includes both air and steam for forming a gaseous mixture which includes nitrogen, carbon dioxide, carbon monoxide and gaseous water.

23. The process of claim 1 including the steps of maintaining said second chamber at a pressure of about 500-2000 p.s.i.g. and at a temperature of about 2000-2500° F., and said oxygen containing gas includes both air and steam for forming a gaseous mixture which includes nitrogen, carbon dioxide, carbon monoxide, and gaseous water.

24. The process of claim 23 including the step of using said gaseous mixture as the reducing agent for iron oxides formed when added steam is converted to hydrogen over the reduced iron oxides, said steam being the direct source of said hydrogen rich gas.

25. The process of claim 1 wherein said transporting step includes providing means for moving said solids to said first chamber.

26. The process of claim 25 including the step of spatially arranging said first chamber, said second chamber and said moving means to provide for gravity flow between said first chamber and said second chamber and between said second chamber and said moving means and for lifting said circulating solids from said moving means to said first chamber.

References Cited

UNITED STATES PATENTS

| | | | |
|---|---|---|---|
| 2,634,286 | 4/1953 | Elliott et al. | 48—197 R |
| 2,654,663 | 10/1953 | Gorin | 48—197 R |
| 2,687,950 | 8/1954 | Kalbach | 48—210 X |
| 2,821,465 | 1/1958 | Garbo | 48—215 |
| 3,347,647 | 10/1967 | Feldkirchner et al. | 48—197 R |
| 3,421,869 | 1/1969 | Benson | 48—197 R |
| 3,556,749 | 1/1971 | Spacil | 48—210 X |

MORRIS O. WOLK, Primary Examiner

R. E. SERWIN, Assistant Examiner

U.S. Cl. X.R.

48—197 R, 210